Figure 1:
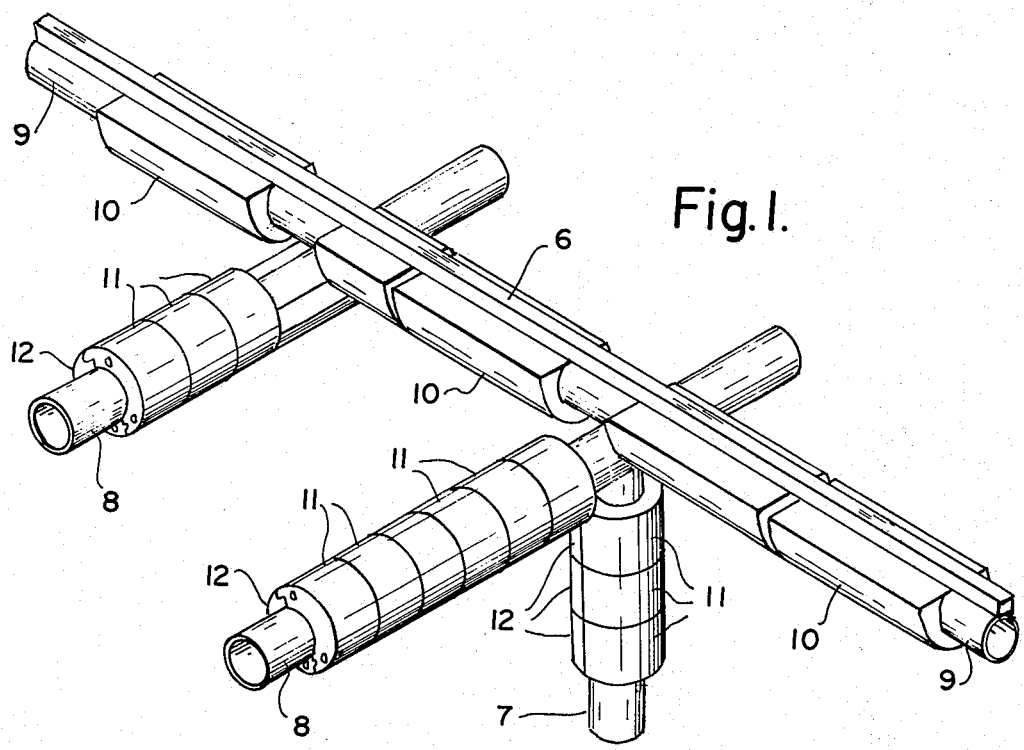

United States Patent [19]
Guskea

[11] 3,914,100
[45] Oct. 21, 1975

[54] PIPE PROTECTIVE COVERING
[75] Inventor: Lee Guskea, Steubenville, Ohio
[73] Assignee: Wheeling-Pittsburgh Steel Corporation, Pittsburgh, Pa.
[22] Filed: July 29, 1974
[21] Appl. No.: 492,684

[52] U.S. Cl............................. 432/234; 432/233
[51] Int. Cl.² ........................................ F27D 3/02
[58] Field of Search ............ 432/233, 234; 138/147, 138/148, 149

[56] References Cited
UNITED STATES PATENTS

| | | | |
|---|---|---|---|
| 3,055,651 | 9/1962 | McCullough | 432/234 |
| 3,226,101 | 12/1965 | Balaz et al. | 432/234 |
| 3,486,533 | 12/1969 | Doherty et al. | 138/147 |
| 3,572,662 | 3/1971 | Weaver et al. | 432/234 |

FOREIGN PATENTS OR APPLICATIONS

| | | | |
|---|---|---|---|
| 856,190 | 12/1960 | United Kingdom | 138/147 |
| 485,531 | 5/1938 | United Kingdom | 138/147 |

*Primary Examiner*—John J. Camby
*Attorney, Agent, or Firm*—Buell, Blenko & Ziesenheim

[57] ABSTRACT

A protective covering for pipes exposed to high heat is formed of pairs of unlike split hollow tile sections which meet in a radial plane in interengaging surfaces along their edges. Those surfaces along one pair of edges are contoured to hinge on each other and those along the other pair of edges are contoured to separate by movement through an arc centered in the hinge. The pairs are held together by pins through their interengaging surfaces.

10 Claims, 4 Drawing Figures

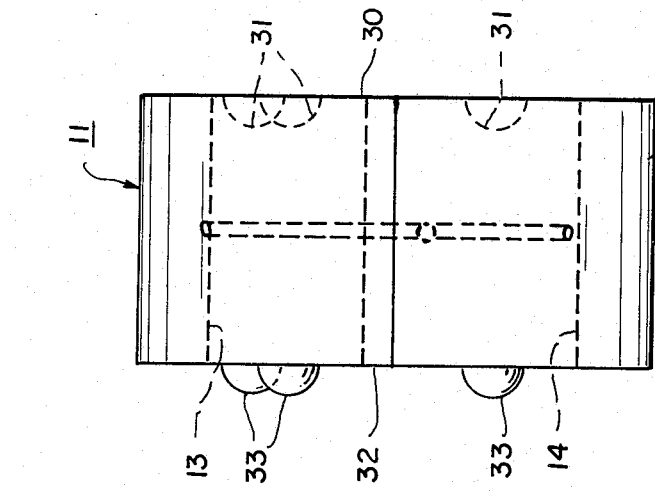
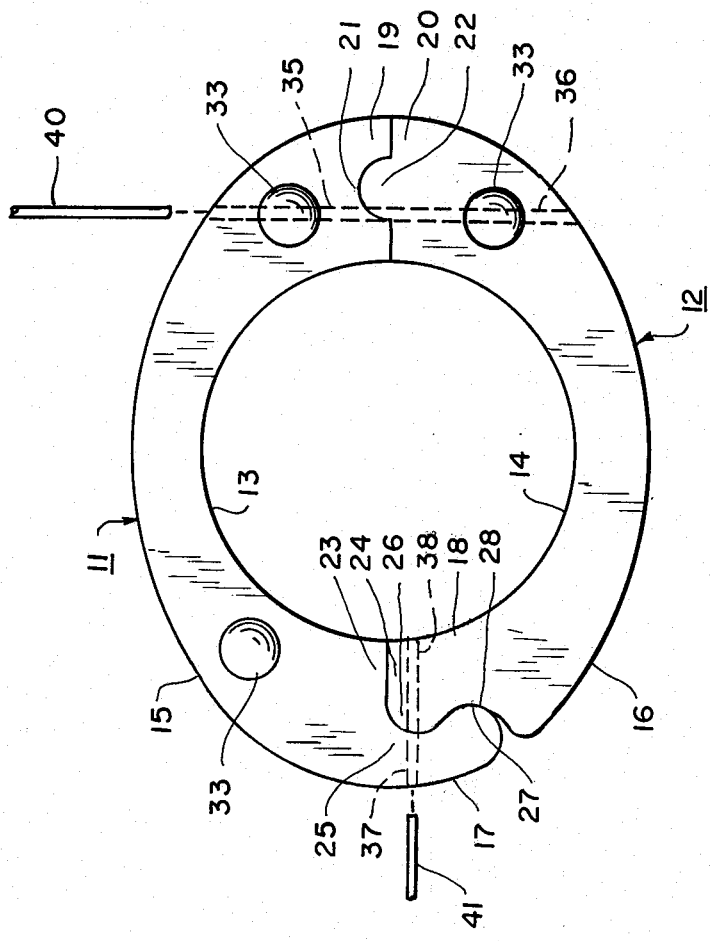

PIPE PROTECTIVE COVERING

This invention relates to coverings for pipe and tubing exposed to high heat. It is more particularly concerned with a split tile covering provided with locking means for the interengaging faces of the tiles.

While the article of my invention is adapted for other uses, it is primarily intended for pipes and other tubular members which must be protected from the high heat of steel mill reheating furnaces. For example, the hearth supporting structure within furnaces for heating steel slabs preparatory to rolling is exposed to temperatures up to 2000°F or higher. That structure is made of steel tubing which is cooled by circulating water through it. If those pipes were not covered with some heat insulating material, the quantity of heat carried out of the furnace by the cooling water would be so great that the lower portion of the furnace could never be maintained as hot as its upper portion.

A system for insulating the hearth supporting structure of such furnaces which has been used in furnaces with which I am familiar is that of Bloom U.S. Pat. No. 2,693,352 issued Nov. 2, 1954. A wire mesh structure is secured around the pipes and is embedded in refractory material which covers the mesh and presents a smooth outside surface. Units of this construction may be preformed as is described in the patent. However, the various embodiments of the Bloom system must be attached to the pipes they cover, and this requires welding the mesh to the pipe or welding studs to the pipe and securing the mesh thereto. Installation is therefore somewhat tedious. A much greater disadvantage, however, is the difficulty of removing the insulation when it becomes necessary to replace it.

The life expectancy of the insulated covering of the hearth supporting structure in a furnace maintained at temperature is substantial. However, heating furnaces for slabs and the like require periodic maintenance. For maintenance operations to take place promptly it is necessary to cool the furnace as rapidly as possible, and water is sprayed into it for this purpose. The thermal shock so administered to refractory pipe coverings accelerates their deterioration, so that sections must be replaced from time to time. In order to remove the insulation of the Bloom patent from the pipe the mesh must be detached from the pipe. As the mesh is made of a high temperature resistant alloy, it is very difficult to burn off and is generally detached with a pneumatic hammer or chisel.

It is an object of my invention to provide a protective covering for slab supporting structure pipes within a heating structure pipes within a heating furnace which is not affixed to the pipes and so is readily applied and removed. It is another object to provide such a protective covering which is prefabricated. It is another object to provide such a protective covering which is resistant to mechanical damage but which protects more fragile thermal insulating material interposed between the protective covering and the pipe. It is another object to provide such a protective covering which is locked in place. It is still another object to provide such a protective covering which is locked in place by means protected from the furnace atmosphere. Other objects of my invention will appear in the course of the description thereof which follows.

The protective covering of my invention is suitable for riser and crossover pipe elements of slab supporting structure, but not for horizontal pipes on which the slabs ride. My protective covering comprises a pair of hollow ceramic tiles which are not identical. The longitudinal edges of the tiles are formed into interengaging shallow tongues and grooves, those along one edge being disposed in a radial plane while those on the other edge are disposed on one side of the radial plane and are so shaped so as to allow the tiles to hinge on each other. Each length of tile is formed with a hole through its tongue and groove at each end, normal to the plane, thereof, and the mating tiles are locked together around the pipe by pins fitting those holes.

The pair of tiles may enclose the pipe in contact therewith or may be of larger internal diameter than the pipe so as to be spaced therefrom all around and to enclose a layer of more fragile thermal insulating material around the pipe.

Embodiments of my invention presently preferred by me are illustrated in the attached figures, to which reference is now made.

Figure 4:
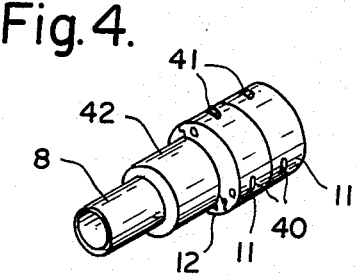

FIG. 1 is a perspective view of a portion of a hearth supporting structure in a slab heating furnace, FIG. 2 is an end elevation of my pipe protective covering, FIG. 3 is a side elevation of the article of FIG. 2, and FIG. 4 is a perspective view of a modification of my invention.

In slab heating furnaces it is conventional to push the slabs along a plurality of horizontal skids running the length of the furnace. Wear bars or skids 6 are normally affixed to supporting pipes 9 which in turn are mounted on crossover pipes 8 disposed transversely of the furnace. Crossover pipes 8 are elevated above the furnace floor by riser pipes 7. Pipes 7, 8 and 9 are cooled by water which is circulated through them. Pipes 9 are protected by protective material 10 which surrounds the under side of the pipe but stops short of the skids 6. The protective covering of my invention is not suitable for that purpose.

Riser pipes 7 and cross over pipes 8 are protected by the protective covering of my invention, which comprises a pair of dissimilar hollow tile sections 11 and 12.

The inner surface 13 of tile 11 is semi-cylindrical in shape, as is likewise the inner surface 14 of tile 12. The outer surface 15 of tile 11 is slightly more than semi-elliptical in cross section, in the amount of arc 17 at the left end thereof, as shown in FIG. 1, and the outer surface 16 of tile 12 is slightly less than semi-elliptical in cross section by the same amount. The cross sections of the tiles 11 and 12 when mating with each other comprise a full ellipse. The inner surfaces 13 and 14 of tiles 11 and 12 meet at each edge on a plane through the longitudinal axis of the ellipse. The wall 19 at the right edge of tile 11 as shown in FIG. 2 and the wall 20 of the mating edge of tile 12 meet in the plane of the long axis of the ellipse in interengaging tongue and groove surfaces. Wall 19 is formed with a longitudinally extending semi-circular groove 21 therein and wall 20 is formed with semi-circular tongue 22 projecting therefrom so as to fill groove 21.

The wall 23 at the other edge of tile 11 and the wall surface 115 of tile 12 meet over a portion of the space between inside surface 13 and outside 15 of tile 11 on the plane of the long axis of the ellipse. From about the mid-point of that space wall 23 merges into a longitudinal semi-circular groove 25 and tongue 27 which respectively extend into and project from a plane normal to the plane of the long axis of the ellipse and extending therefrom only in the direction of tile 12. Tongue 27 which projects inwardly of tile 11 rounds off into arc 17 of outer surface 15 of tile 11 which has been previously mentioned. Tile 12 is formed with a tongue 26 which mates with groove 25 and tongue 27 respectively of tile 11.

The end faces of tiles 11 and 12 are flat and disposed at right angles to the axis of the cylindrical center space between the mating tiles. One end face 30 of tile 11 is provided with hemispherical depressions or dimples 31 and the other end face 32 is provided with hemispherical projections or pimples 33, dimensioned and spaced so as to mate with the dimples of an adjoining tile face. The end faces of tile 12 are similarily formed.

A hole 35 is provided extending from outside surface 15 of tile 11 through wall 19 at one end, normal thereto. A mating hole 36 is provided in tile 12 extending from outside surface 16 through wall 20, likewise normal thereto. A pin 40 fits snugly in holes 35 and 36 and is long enough to extend therethrough. In like manner tile 11 is also provided with a hole 37 which extends from outside surface 15 through groove 25 parallel to the long axis of the ellipse previously mentioned. A mating hole 38 is provided in tile 12 extending from its inside surface 14 through tongue 26. A pin 41 fits snugly in holes 37 and 38 and is long enough to extend therethrough.

It will be observed that tiles 11 and 12 when brought together in the absence of pins 40 and 41 are hinged on each other where tongue 27 mates with groove 28 so that walls 19 and 20 can be moved away from each other through an arc centered in tongue 27. My protective covering is applied to a crossover pipe by hanging a pair of tiles 11 and 12 hinged together as above described over the pipe and bringing the opposite ends of the tile together beneath the pipe. This movement aligns hole 35 with hole 36 and hole 37 with hole 38. Pin 40 is then inserted through holes 35 and 36 so that its ends extend beyond the tiles and the extended ends are bent over against outside surfaces of the tiles. Pin 41 is inserted through holes 37 and 38 and its outer end is bent over in the same manner. Pins 40 and 41 are largely protected from the furnace atmosphere by the tiles which surround them. The next pair of tiles 11 and 12 is fitted against the pipe in the same way and pushed along the pipe against the pair first mentioned so that the dimples in the end faces of one pair receives the pimples in the end faces of the adjoining pair.

My protective covering is applied to riser pipe 7 by hinging a pair of tiles 11 and 12 around the lowest unprotected portion of the riser pipe and bringing their other ends together. Pins 40 and 41 may be inserted as before through their respective holes if desired. However, those pins may be omitted if successive pairs of tiles 11 and 12 are stacked on the lowermost pair with the hinged ends of alternate pairs on top of the other ends of the pair below. The stack of tiles so formed is prevented from moving by the interlocking dimples 31 and pimples 33. For this purpose, of course, it is necessary to have dimples 31 and pimples 33 arranged so that stacked pairs of tiles can be interlocked head to toe.

FIG. 4 illustrates a modified form of pipe protective covering of my invention as applied to a crossover pipe. The tiles 11 and 12 are made with the inside diameter of their combined cavity greater than the outside diameter of crossover pipe 8, and before the tiles 11 and 12 are placed around crossover pipe 8, it is provided with a layer 42 of thermal insulating material such as slag wool, fiber glass, or the like. The tiles 11 and 12 are then placed around the pipe as before and locked with pins 40 and 41. The outer end of pin 41 is bent down around the outside surface of tile 11 as shown, and both ends of pin 40 are bent up around the outer surfaces of tiles 11 and 12. The tiles, which are of ceramic material and are relatively hard, protect the softer and more fragile thermal insulating material 42 from mechanical damage. The heat loss of the modified form of my pipe protective covering above described is appreciably less than the heat loss of my pipe protective covering in which the tiles themselves make direct contact with the enclosed pipe.

While I have denominated the outer profile of my protective covering an ellipse, it need not, of course, be truly elliptical, but may be oval, or circular, or otherwise shaped. In general, it will have a major and a minor axis because the thickness of wall required for the interengaging surfaces at the edges of the mating tiles is usually greater than that required only for insulating purposes. The plane on which the tile halves meet need not coincide with that of the major axis of the protective covering cross section. The interengaging surfaces at the end opposite the hinged end of the protective covering need not be tongue and groove, but may be simple overlapping surfaces, for example. However, they must be contoured so as to come together along an arcuate path. The pins, of course, need not be precisely normal or parallel to the radial plane but generally speaking, the pins at the opposite ends of the plane will be disposed more or less normal to each other.

In the foregoing specification I have described presently preferred embodiments of my invention; however, it will be understood that my invention can be otherwise embodied within the scope of the following claims.

I claim:

1. Pipe protective covering comprising a pair of hollow ceramic tiles shaped to enclose a pipe, the inner surface of each tile in cross section comprising a semicircle, the tiles meeting along their edges in interengaging surfaces, one pair of such surfaces being contoured to hinge on each other and the other pair of such surfaces being contoured to separate by movement through an arc centered in the hinge axis.

2. The article of claim 1 in which the interengaging surfaces are tongue and groove surfaces.

3. The article of claim 2 in which a tongue of the interengaging surfaces of the hinged pair projects inwardly of its tile.

4. The article of claim 2 in which the crests and valleys of the tongues and grooves are generally semicircular in profile.

5. The article of claim 1 in which the interengaging surfaces of the hinged pair are positioned on one side only of a plane through the diameter of the semi-circle.

6. The article of claim 5 including a pin extending through the interengaging surfaces of the hinged pair disposed in a plane parallel to the plane through the diameter of the semi-circle and spaced therefrom.

7. The article of claim 5 in which the interengaging surfaces are tongue and groove surfaces and the tongue of the other pair of surfaces projects from the plane through the diameter of the semi-circle on the other side thereof.

8. The article of claim 5 including a pin extending through the interengaging surfaces of the hinged pair and a pin extending through the interengaging surfaces of the other pair, the pins being generally normal to each other.

9. The article of claim 1 including a pin extending through the interengaging surfaces of the other pair normal to a plane through the diameter of the semi-circle.

10. The article of claim 1 in which the outer surface of the mated tiles is of substantially elliptical cross section and the major axis of the ellipse lies on the diameter of the semi-circle.

* * * * *

UNITED STATES PATENT OFFICE
CERTIFICATE OF CORRECTION

PATENT NO. : 3,914,100
DATED : October 21, 1975
INVENTOR(S) : LEE GUSKEA

It is certified that error appears in the above-identified patent and that said Letters Patent are hereby corrected as shown below:

Column 1, line 53, after "heating" delete
--structure pipes within a heating--.

Column 2, line 63, delete "surface 115" and insert
--24--.

Column 2, line 64, after "outside" insert --surface--.

Signed and Sealed this tenth Day of February 1976

[SEAL]

Attest:

RUTH C. MASON
Attesting Officer

C. MARSHALL DANN
Commissioner of Patents and Trademarks